United States Patent
Katsumura et al.

(10) Patent No.: US 6,424,738 B1
(45) Date of Patent: *Jul. 23, 2002

(54) IMAGE PROCESSING APPARATUS FOR ANALYZING A FEATURE OF AN INPUT IMAGE OF AN ARTICLE AND STORING FEATURE DATA INDICATING THE FEATURE IN CORRESPONDENCE WITH THE INPUT IMAGE

(75) Inventors: Noriyoshi Katsumura, Tokorozawa; Hiroaki Takatsuto, Hachioji, both of (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,691
(22) PCT Filed: Nov. 11, 1997
(86) PCT No.: PCT/JP97/04093
§ 371 (c)(1),
(2), (4) Date: Jun. 19, 1998
(87) PCT Pub. No.: WO98/22888
PCT Pub. Date: May 28, 1998

(30) Foreign Application Priority Data

Nov. 15, 1996 (JP) .............................................. 8-318609

(51) Int. Cl.⁷ ................................................. G06K 9/00
(52) U.S. Cl. ........................................ 382/165; 382/162
(58) Field of Search .................................. 382/162, 163, 382/164, 165, 166, 167, 168, 169, 170, 113, 233, 191, 209, 305, 306; 358/75

(56) References Cited

U.S. PATENT DOCUMENTS

| | | | | |
|---|---|---|---|---|
| 5,032,904 A | * | 7/1991 | Murai et al. | 358/75 |
| 5,513,271 A | * | 4/1996 | Rao et al. | 382/113 |
| 6,014,464 A | * | 1/2000 | Kurzweil et al. | 382/233 |
| 6,181,818 B1 | * | 1/2001 | Sato et al. | 382/170 |

OTHER PUBLICATIONS

A. Jain et al; Image Retrieval Using Color and Shape; 1996; pp. 1233–1244; Pattern Recognition vol. 29, No. 8.

C. Faloutsos; Efficient and Effective Querying by Image Content; 1994; pp. 231–262; Journal of Intelligent Information Systems.

* cited by examiner

*Primary Examiner*—Phuoc Tran
*Assistant Examiner*—Amir Alavi
(74) *Attorney, Agent, or Firm*—Frishauf, Holtz, Goodman & Chick, P.C.

(57) ABSTRACT

Disclosed is an image processing apparatus for processing an image input from an image input device such as a digital camera. Upon reception of an image of an article from the image input device, this image processing apparatus discriminates the color and size of the article, and stores pieces of data indicating the discriminated color and size in correspondence with the image. When a color or size is designated as search data, the apparatus searches an image memory for images corresponding to the designated contents and displays them in the form of a list. When an article is imaged, pieces of feature data indicating the feature of the article are added and stored with respect to the image. When feature data is designated, the image of a desired article can be immediately searched out from many images.

7 Claims, 12 Drawing Sheets

FIG.4

| ARTICLE NAME | COLOR | SIZE | DATE | IMAGE DATA | OTHER FEATURES |
|---|---|---|---|---|---|
| BAG | BLUE | LARGE | 96.02.27 | BLUE | STRIPED PATTERN |
| BAG | BLACK | INTERMEDIATE | 96.02.25 | BLACK | LEATHER |
| BAG | BLUE | SMALL | 96.02.20 | BLUE | CIRCULAR |
| ...... | ...... | ...... | ...... | ...... | ...... |

PT

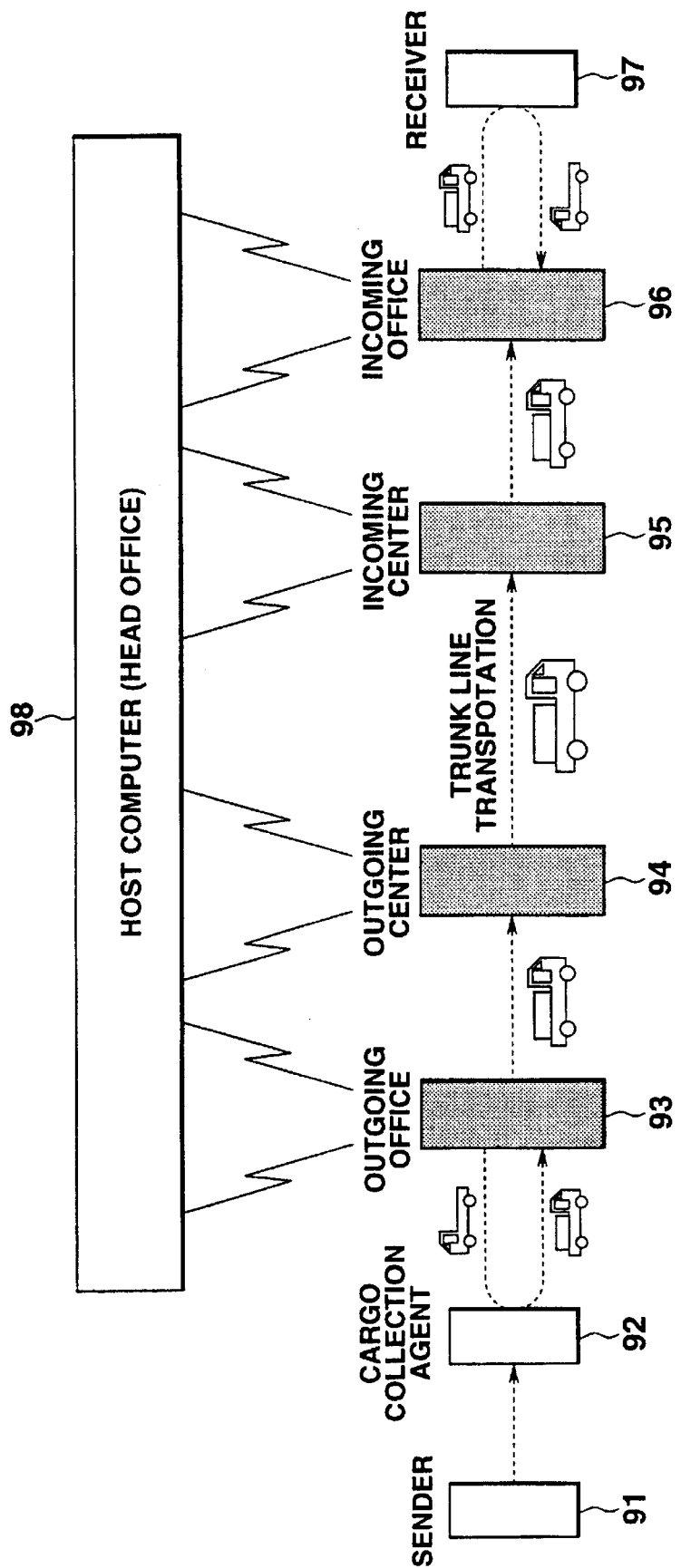

IMAGE PROCESSING APPARATUS FOR ANALYZING A FEATURE OF AN INPUT IMAGE OF AN ARTICLE AND STORING FEATURE DATA INDICATING THE FEATURE IN CORRESPONDENCE WITH THE INPUT IMAGE

TECHNICAL FIELD

The present invention relates to an image processing apparatus for processing an image input from an image input device such as a digital camera.

BACKGROUND ART

In a carrier service called a door-to-door delivery service, a computer communication system is generally introduced to maintain security for packages and realize high-speed operations.

FIG. 9 schematically shows the flow of a package in a carrier service. A package from a sender 91 is collected in a cargo collection agent 92. When a carrier comes to the cargo collection agent 92 to pick up the package, he/she inputs the data (slip number) of the package to a handy terminal he/she is carrying. The package is then carried to an outgoing office 93. In this case, the package data in the handy terminal is uploaded into a personal computer installed in the outgoing office 93. This package data is transmitted from the outgoing office 93 to a host computer 98 in a head office. The package is sequentially carried to an outgoing center 94, an incoming center 95, and an incoming office 96 to be delivered to a receiver 97. Every time the package is carried to the outgoing center 94, the incoming center 95, and the incoming office 96, the package data is transmitted to the host computer 98 in the head office. The host computer 98 in the head office performs tracking management for the package on the basis of the package data until the package is delivered to the receiver 97.

If, for example, the written address or name of the receiver is wrong, the package cannot be delivered to the receiver. In this case, the package is carried back to the incoming office 96 and stored therein until the sender 91 or the receiver 97 makes an inquiry about the package. When an inquiry about the package is made, a search for the package is made by using the package tracking data managed by the host computer 98 in the head office, thereby finding the "addressee unknown" package and delivering it to the receiver.

Upon reception of an inquiry about the package, the host computer 98 in the head office searches for the package tracking data with the slip number handed to the sender 91 to find the "addressee unknown" package. If, however, the sender 91 loses or discards the received slip, the operator must go to the depository. There, it can take much time to find the package. In this case, therefore, the operator cannot give an immediately reply, and must make contact with the inquirer afterward. In addition, the package may not be found after a long search. As a result, problems are posed in terms of reliability as well as security and quick operation.

It is an object of a present invention to analyze the feature of an image of an article and store feature data indicating the feature in correspondence with the image so as to enable a quick search for the image of the desired article on the basis of the feature data.

DISCLOSURE OF INVENTION

According to the present invention, there is provided an image processing apparatus for processing an input image, comprising:

image input means for inputting an image of an article;

analyzing means for analyzing a feature of the article on the basis of the image of the article which is input from the image input means, and obtaining feature data indicating the analysis result;

image storage means for adding the feature data obtained by the analyzing means to the image input from the image input means, and storing the feature data and the image in correspondence with each other;

designation means for designating feature data to be used for a search; and search means for searching the image storage means for an image corresponding to the feature data designated by the designation means, and outputting the image.

According to the present invention, therefore, the feature of an image of the article is analyzed, and pieces of feature data indicating the feature are stored in correspondence with the image. With this operation, the image of the desired article can be quickly searched out on the basis of the feature data. By only imaging articles in advance, therefore, a desired article can be quickly specified from a plurality of articles on the basis of the images.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a view showing the arrangement of the image data storage section PT in FIG. 3;

FIG. 9 is a view showing the flow of a delivery package in a conventional carrier service.

BEST MODE OF CARRYING OUT THE INVENTION

An embodiment of the present invention will be described below with reference to FIGS. 1 to 8C.

Figure 1:
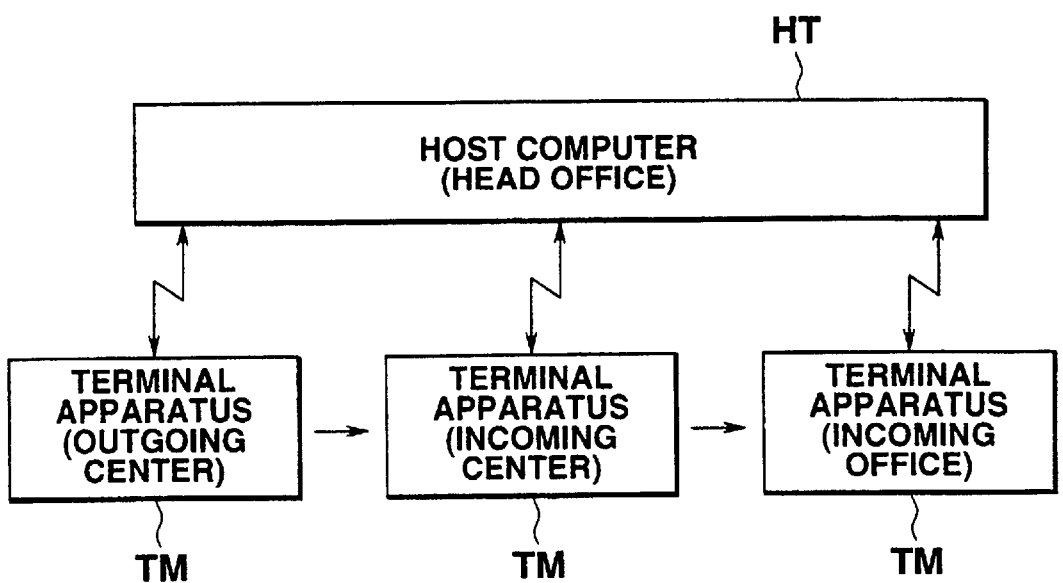
FIG. 1 is a view showing the overall arrangement of a computer communication system including an embodiment of an image processing apparatus according to the present invention.

FIG. 1 schematically shows the arrangement of part of a computer communication system constructed in a carrier service and including an image processing apparatus according to an embodiment of the present invention.

A host computer HT installed in a head office for administering domestic centers and offices exchanges data with terminal apparatuses (personal computers) TM installed in outgoing centers, incoming centers, incoming offices, and the like through public telephone lines, and collects/manages the data transmitted from the respective terminal apparatuses TM.

Figure 2:
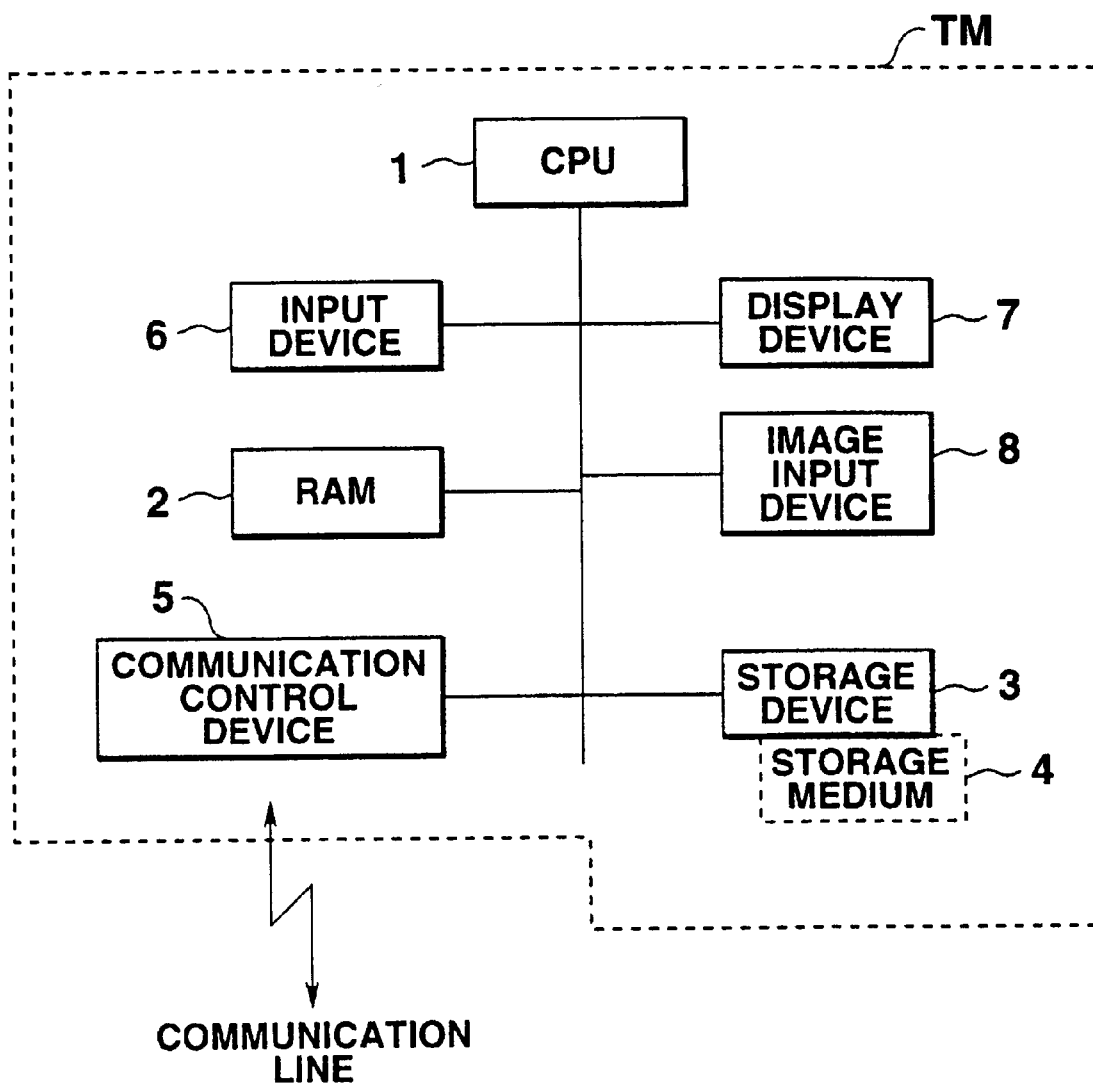
FIG. 2 is a view showing the arrangement of the terminal apparatus TM in FIG. 1.

FIG. 2 is a block diagram showing the overall arrangement of the terminal apparatus TM installed in each of the centers and offices.

A CPU 1 is a central processing unit for controlling the overall operation of the terminal apparatus TM in accordance with various programs stored in a program memory (not shown). A storage device 3 has a storage medium 4 in which programs, data, and the like are stored. This storage medium 4 is a magnetic or optical storage medium or a semiconductor memory. The storage medium 4 is permanently or detachably mounted in the storage device 3. The programs, data, and the like to be stored in the storage medium 4 may be received and stored from another device connected through a communication line or the like. Alternatively, the storage device 3 having the storage medium 4 may be mounted on another device side which is connected through the communication line or the like so that the programs and data stored in the storage medium 4 are used through the communication line. When a program and data are transmitted from another device through a communication control section 5, the CPU 1 receives the program and the data and stores them in the storage device 3. In addition, an input device 6, a display device 7, and an image input device 8 are connected as peripheral devices to the CPU 1. The CPU 1 controls the input/output operations of these devices.

The image input device 8 has a keyboard and a pointing device. Various conventional keys are arranged on the keyboard, which is used to input character string data and commands. In this case, the character string data input from the input device 6 is displayed/output onto the display device 7 or stored in the RAM 2. Upon reception of an image input command from the input device 6, the CPU 1 receives the image data from the image input device 8 and stores it in the RAM 2. The image input device 8 is an electronic still camera (digital camera) having a solid-state image pickup element (CCD image sensor or the like), and is detachably connected to the terminal apparatus TM. The image input device 8 images an object (the contents of an "addressee unknown" package) as a color image and stores/holds it in its internal image memory. The CPU 1 fetches the image from the image input device 8 and displays/outputs onto the display device 7 or temporarily stores it in the RAM 2. The image input device 8 has a timepiece function. When, therefore, the image input device 8 images an "addressee unknown" package, the current date data obtained by the time-piece function is stored in the image memory in the image input device 8 in correspondence with the image.

Figure 3:
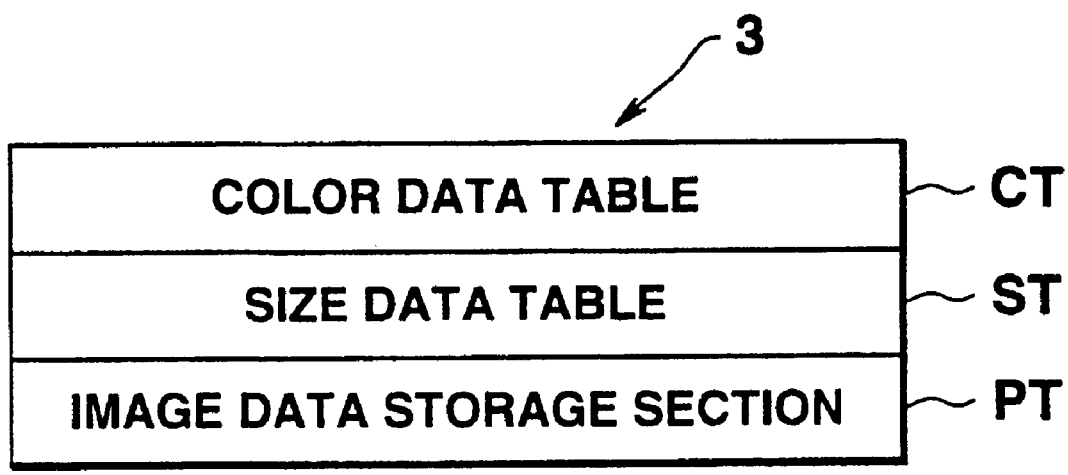
FIG. 3 is a view showing the main arrangement of the storage device 3 in FIG. 2.

FIG. 3 shows part of the storage device 3. The storage device 3 has a color data table CT, a size data table ST, and an image data storage section PT. The color data table CT is used to permanently store various color data. The CPU 1 compares the image fetched from the image input device 8 with the contents of the color data table CT to determine the color of the image. In this case, the main color (the dominant color in terms of area and most stimulating) of the image is determined as its image color. Note that in determining the color of the image, an approximate color like a reddish or bluish color may be determined. The size data table ST is used to permanently store data indicating various sizes. For example, a plurality of types of frame patterns such as square and rectangular patterns are stored as data indicating sizes. The CPU 1 compares the size of the image fetched from the image input device 8 with the contents of the size data table ST to determine the size of the image. In this case, each article is imaged by the image input device 8 at an almost constant distance (about 1 m) from each article. The image data storage section PT is used to store the image input from the image input device 8. Various pieces of link data are set in correspondence with the images in the image data storage section PT. Note that the contents of the color data table CT, the size data table ST, and the image data storage section PT are loaded from the storage device 3 into the RAM 2.

FIG. 4 shows the arrangement of the image data storage section PT.

The image data storage section PT is designed to store "article name", "color", "size", "date", "image", and "other features". In this case, "article name" indicates the type of each "addressee unknown" package. The character string data (article name) input from the input device 6 is stored in the image data storage section PT as link data corresponding to each image. In addition, "color" and "size" are data which are automatically determined by analyzing images and comparing the analysis results with the contents of the color data table CT and the size data table ST. These data are stored in the image data storage section PT as pieces of link data corresponding to the respective images. "Date" indicates the date when each "addressee unknown" package was imaged. The CPU 1 fetches the date data corresponding to an image from the image input device 8, and stores it in the image data storage section PT. The data indicating "other features" are also arbitrarily input from the input device 6 as character string data. For example, data indicating the appearance feature of packages, e.g., "pattern", "material", and "shape", are stored in the image data storage section PT as pieces of link data corresponding to the respective images.

The operation of this terminal apparatus TM will be described next with reference to the flow charts of FIGS. 5A and 5B and FIGS. 7A, 7B, and 7C. Note that the programs for implementing the functions described in these flow charts are stored in the storage medium 4 in the form of program codes which can be read by the CPU 1, and the contents of these programs are loaded into the program memory in the RAM 2.

In keeping an "addressee unknown" package, the operator extracts an article from the package, and images the article with the image input device 8 at an almost constant distance. The operator inputs an image input command through the input device 6 while the image input device 8 is connected to the terminal apparatus TM. The operation is then executed/started in accordance with the flow charts of FIGS. 5A and 5B.

More specifically, the CPU 1 reads a one-frame image from the image input device 8 (step A1), and stores it in the image data storage section PT (step A2). The CPU 1 analyzes the image and compares the analysis result with the contents of the color data table CT (step A3). If, for example, the main color of the image like a three-color pattern image cannot be determined as a result of comparison (NO in step A4), guidance display is performed to request the operator to input/designate an image color. When color data is input in response to this prompt (step A5), the color data is set in the image data storage section PT as link data corresponding to the image (step A6). If the main color of the image can be determined as a result of comparison (YES in step A4), the determined color data is set in the image data storage section PT as link data corresponding to the image (step A7).

Subsequently, the CPU 1 determines the size of the image by comparison with the contents of the size data table ST (step A8). In this case, if, for example, the image is excessively large or small, and the size of the image cannot be determined (NO in step A9), a message for requesting the operator to input size data is displayed. When size data is input in response to this prompt (step A10), the size data is set in the image data storage section PT (step A11). If the size of the image can be determined (YES in step A9), the determined size data is set in the image data storage section PT (step A12).

Figure 5A:
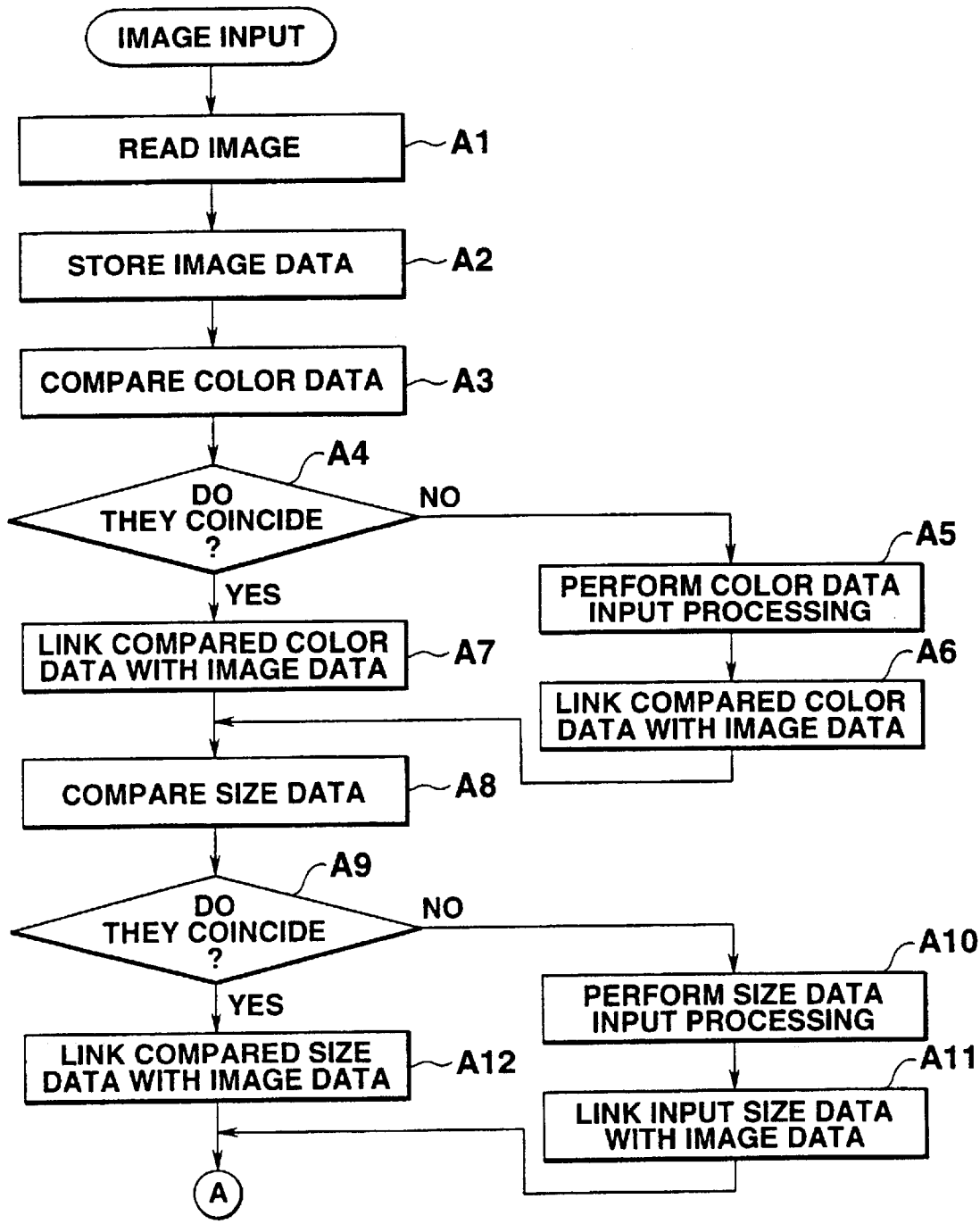
FIGS. 5A and 5B are flow charts showing an image input processing.
Figure 5B:
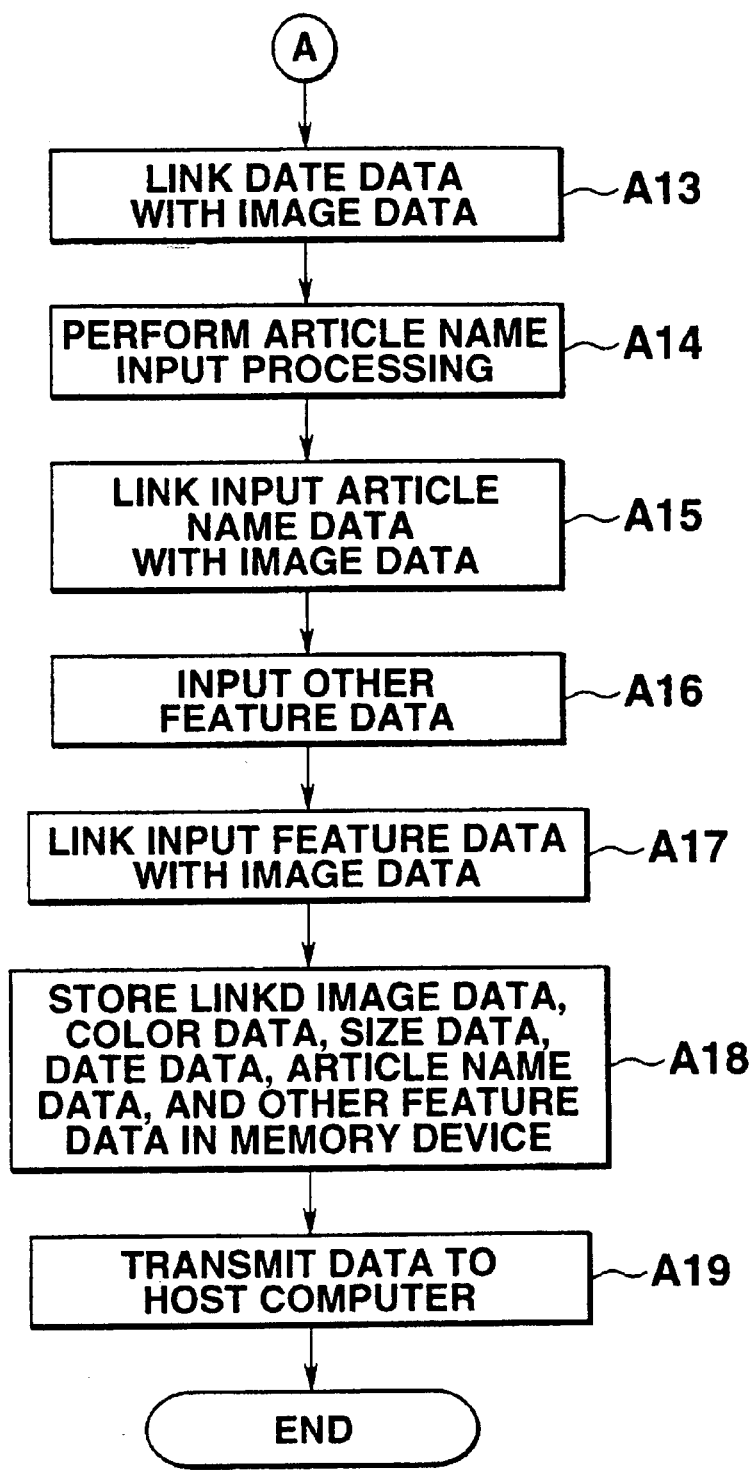

When setting of the color and size of the image as pieces of link data corresponding to the image in the image data storage section PT is complete in this manner, the flow advances to step A13 in FIG. 5B to fetch the imaging date and set it in the image data storage section PT as link data corresponding to the image. Thereafter, a message for requesting the operator to input an article name with the input device 6 is displayed. When an article name is input in response to this prompt (step A14), the article name is set in the image data storage section PT (step A15). If the article is further observed, and another feature associated with the pattern, material, shape, or the like of the article is found, the feature is input as other feature data (step A16). The input feature data is set in the image data storage section PT (step A17).

Figure 6:
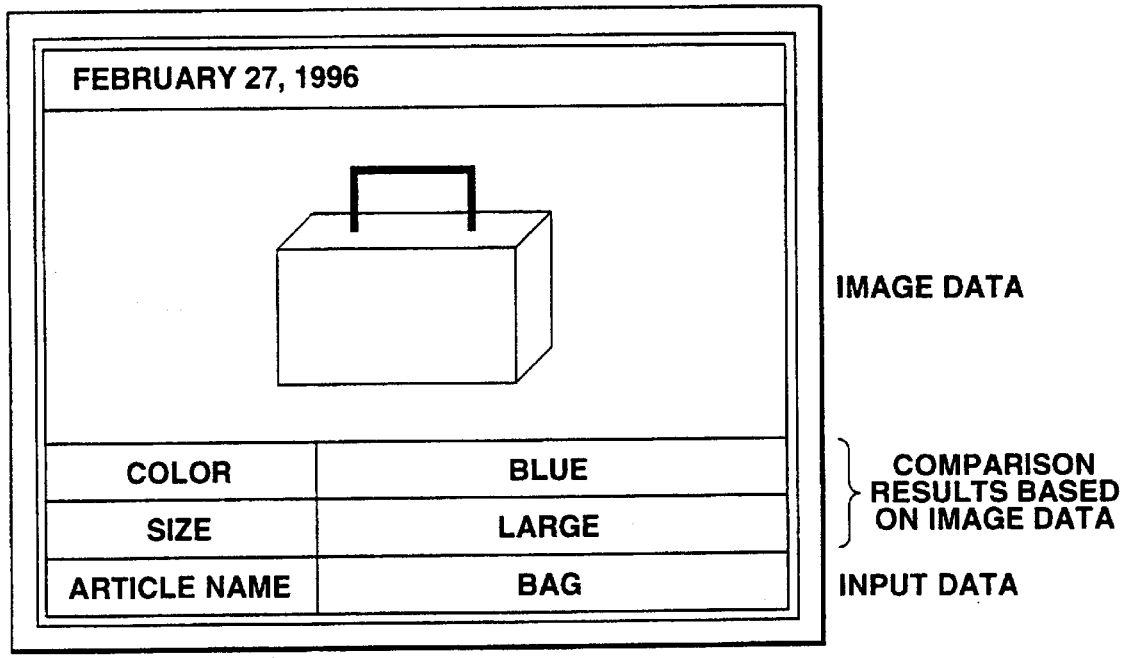
FIG. 6 is a view showing a sample display in an image input processing.
Figure 7A:
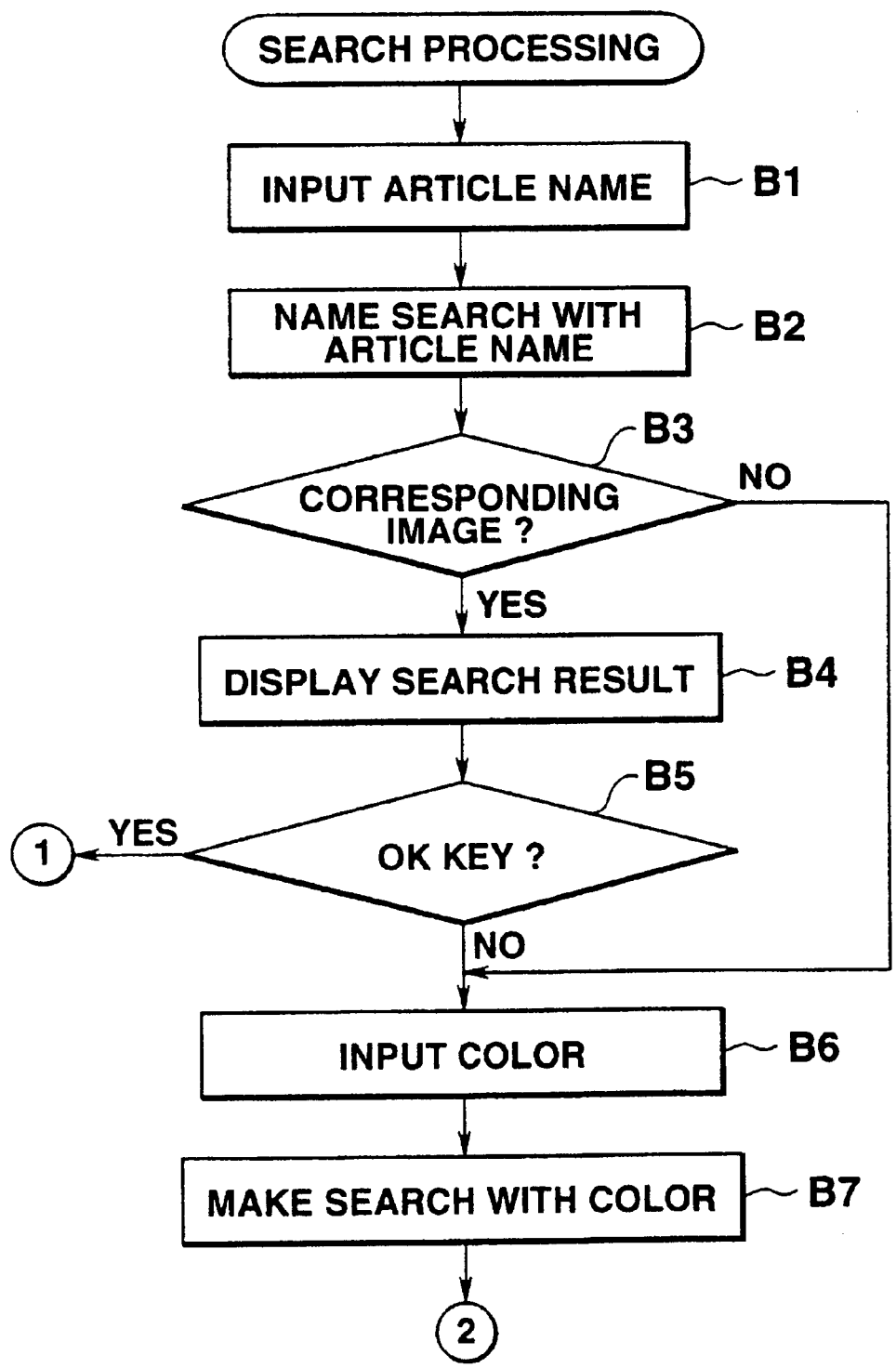
FIGS. 7A to 7C are flow charts showing an image search processing.
Figure 7B:
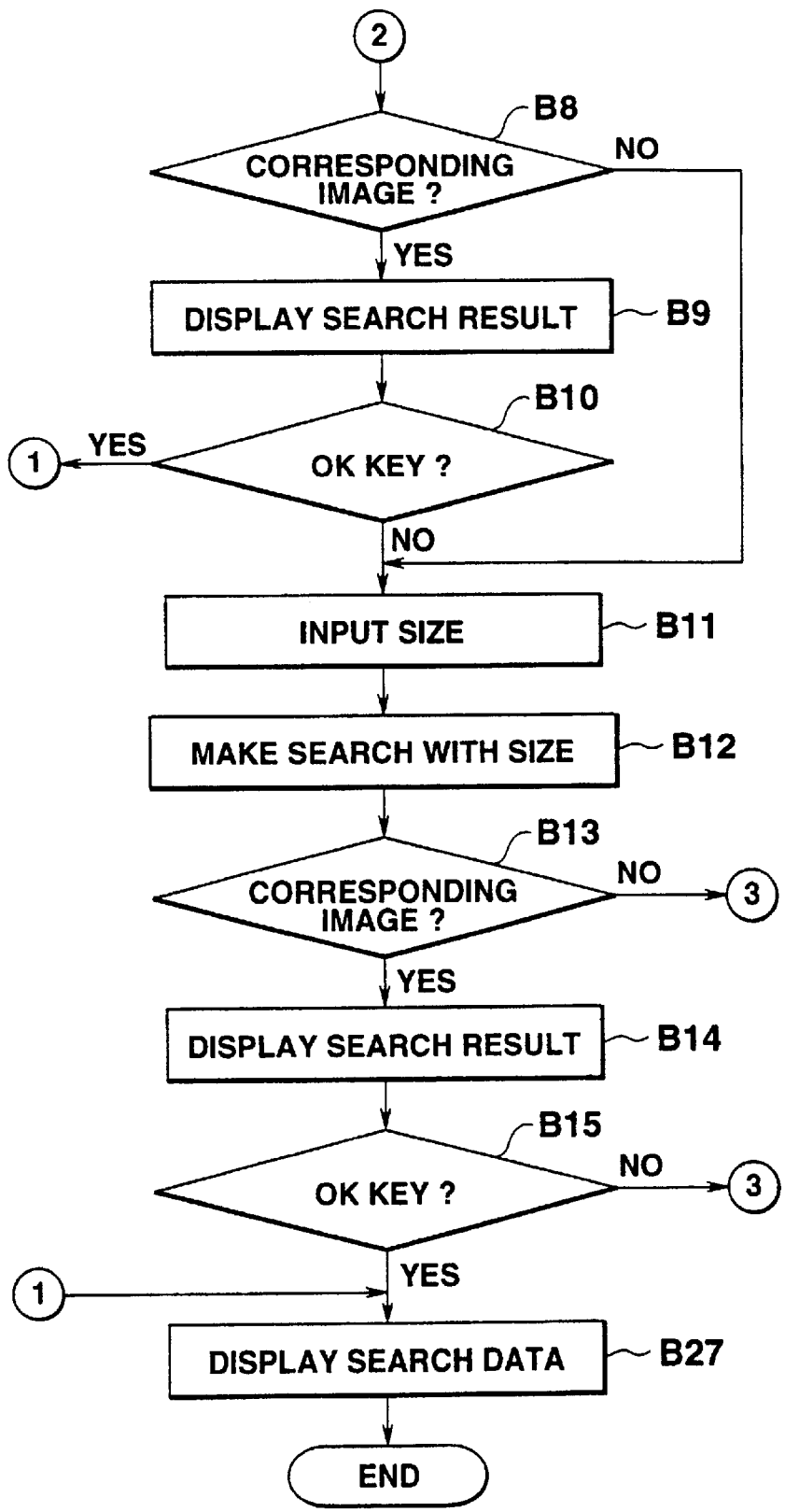
Figure 7C:
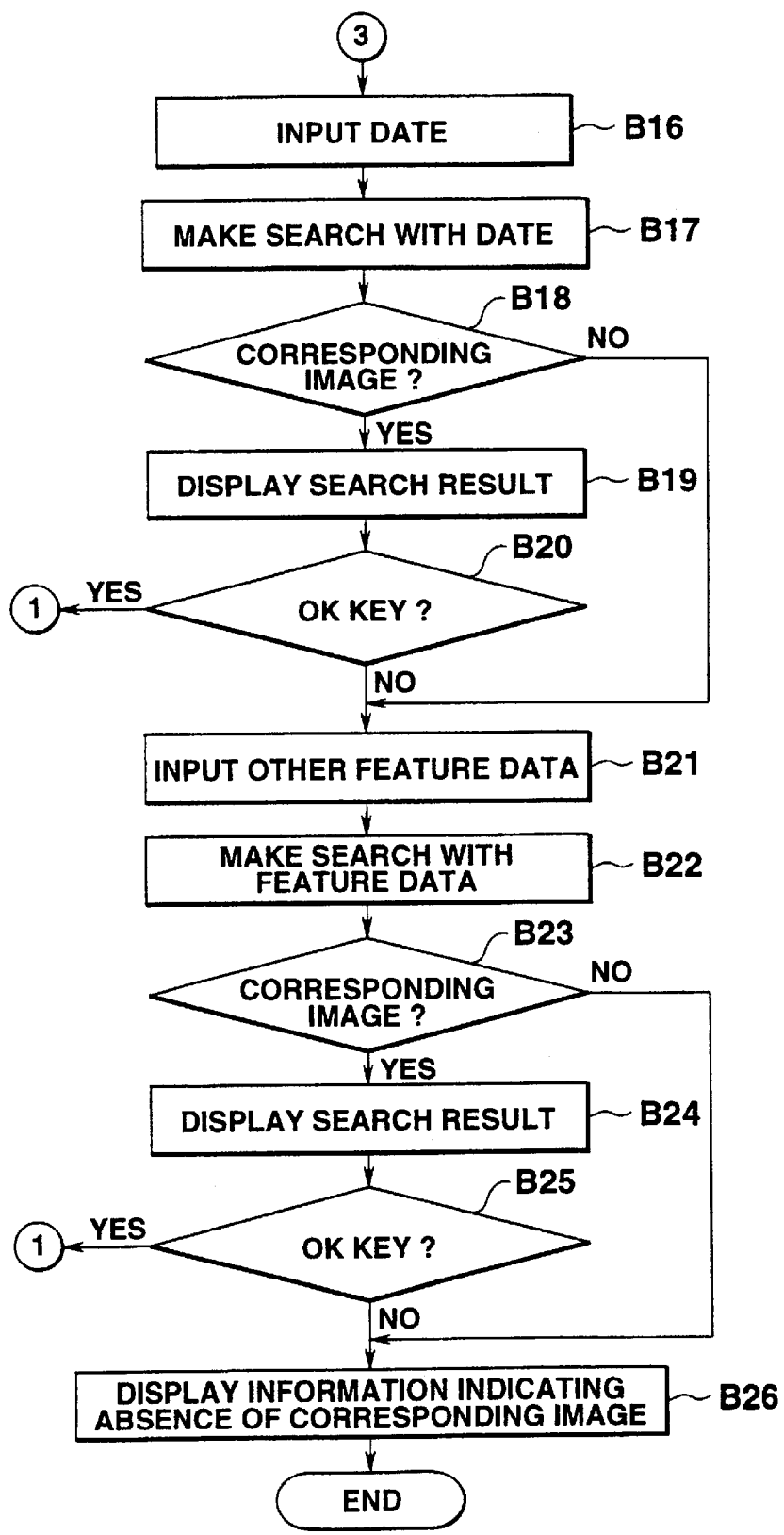

After various pieces of link data are set in the image data storage section PT in correspondence with the image, the contents of the image data storage section PT are registered/held in the storage device 3 (step A18), and are transmitted to the host computer HT through the communication control section 5 (step A19). If there are a plurality of frames of images, pieces of link data are set in the image data storage section PT in units of images, and are registered/held in the storage device 3 or transmitted to the host computer HT. FIG. 6 shows a screen display in such an image input operation. Every time link data is determined or input, the corresponding contents are displayed/output, together with the image.

Assume that a sender or receiver makes an inquiry about a package, and the sender has lost or discarded the slip. In this case, the "addressee unknown" packages in safekeeping are searched for the desired package. In this operation, search processing for specifying the package from an image is performed in accordance with the flow charts of FIGS. 7A to 7C. Upon reception of this search command from the input device 6, the CPU 1 reads out the contents of the image data storage section PT from the storage device 3, loads them into the RAM 2, and performs the operation based on the flow charts.

Figure 8A:
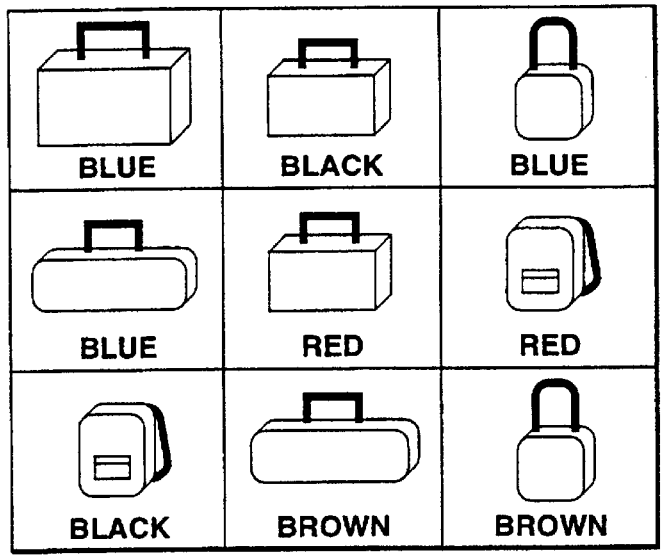
FIGS. 8A to 8C are sample displays in the image search processing.

First, the operator inquires of the sender or receiver about the article name, and inputs the article name through the input device 6 (step B1). In response to this operation, the CPU 1 searches the image data storage section PT (step B2), and checks whether images having the input article name are present (step B3). If the images having the input article name are present, the CPU 1 displays them on the display screen in the form of a list (step B4). FIG. 8A shows a screen display in a case wherein "bag" is input as an article name.

If a desired image is included in this list of images, the operator moves the cursor to the position of the image to select it, and operates the OK key (selection execution key) (step B5).

If the desired image cannot be specified by only the article name, the flow advances to step B6 to input color data through the input device 6. If there are no images having the input article name (NO in step B3), the steps B4 and B5 are skipped. That is, all images are selected and the flow advances to the step of inputting color data (step B6).

Figure 8B:
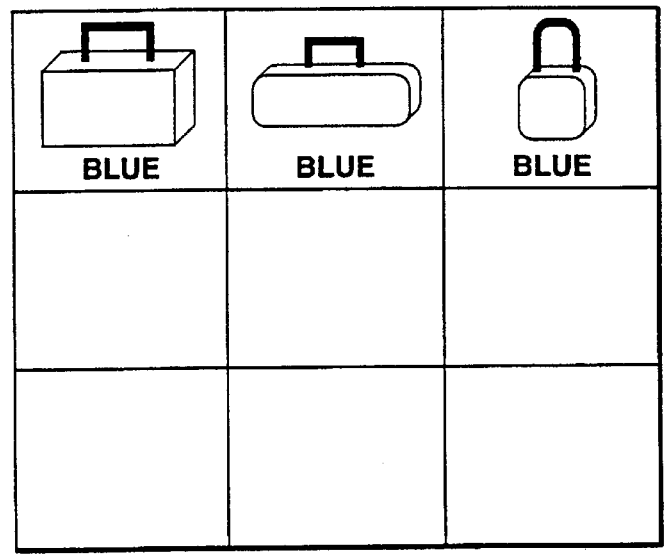

When the operator makes an inquiry about the color and inputs color data through the input device 6, the CPU 1 searches the image data storage section PT for images corresponding to the currently input color data among the images having the input article name (step B7). If the CPU 1 checks whether images having the input color are present (step B8). If the images having the input color are present, the CPU 1 extracts only those images and displays them in the form of a list (step B9). FIG. 8B shows a screen display in this case, in which only the blue bags are extracted from the bags and displayed in the form of a list. If the operator can find a desired image, he/she moves the cursor to the position of the desired image and operates the OK key (step B10).

If the desired image cannot be specified by only the article name and the color, the flow further advances to step B11 to input size data through the input device 6. In this case, as the size data, numerical data like "some cm long and some cm wide" is input. If NO in step B8, steps B9 and B10 are skipped and the flow advances to the step of inputting size data (step B11).

Figure 8C:
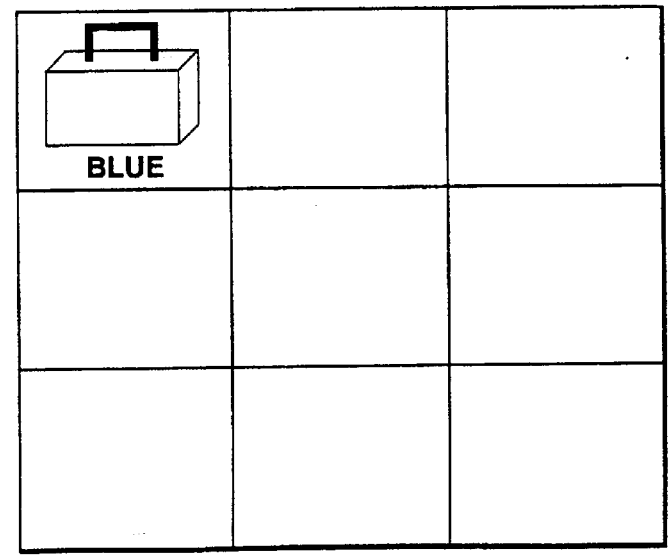

In this case, the CPU 1 searches the size data table ST on the basis of the input size data. If the article name and the color have already been input as search data, the CPU 1 searches the image data storage section PT for images having the currently input size among the images having the input article name and the input color (step B12). If the images having the currently input size are present (YES in step B13), the CPU 1 extracts only those images and displays them in the form of a list (step B14). FIG. 8C shows a screen display in this case, in which the large bag is extracted from the blue bags and displayed. In this case, only one image is extracted. If this image coincides with the desired package, the OK key is operated (step B15).

If there are several large bags are extracted from the blue bags but the desired image cannot be specified by only the article name, the color, and the size, the flow further advances to step B16. If NO in step B13, the steps B14 and B15 are skipped and the flow further advances to step B16.

In step B16, the operator inputs date data through the input device 6. The CPU 1 then searches the image data storage section PT on the basis of the date data (step B17). If images having the input date are present (step B18), the CPU 1 displays them in the form of a list (step B19). If the desired image is present in this list, the operator selects it and operates the OK key (step B20). If the desired image is not present, the operator inputs other feature data (step B21). Subsequently, the image data storage section PT is searched on the basis of the input feature data in the same manner as described above (step B22). If corresponding images are present (step B23), the CPU 1 displays them in the form of a list (step B24). If the OK key is not operated either in this case (NO in step B25), guidance display is performed to indicate the absence of a corresponding image. That is, if there is no corresponding image even after the input of the article name, the color, the size, the date, and other feature data, guidance display is performed to inform it. If the OK key is operated in step B5, B10, B15, B20, or B25, the flow advances to step B27 to read out the selected/confirmed image from the image data storage section PT, together with the corresponding pieces of link data, and display/output them.

As described above, in keeping an "addressee unknown" package, the operator in the incoming office or the like images the package with the image input device 8. This image is stored in the image data storage section PT in the terminal apparatus TM. In this case, the color and size of the image are determined and set in the image data storage section PT as pieces of link data corresponding to the image. In addition, the article name and other feature data input from the input device 6 or the automatically generated date data as well are set in the image data storage section PT as pieces of link data corresponding to the image. When the operator inputs an article name, a color, a size, a date, and other features as pieces of link data upon inquiry from a sender or receiver, the contents of the image data storage section PT are searched every time link data is input, and the search results are displayed as a list of images. In this case, every time link data is input, objects to be searched out are gradually narrowed down. The desired package can therefore be easily specified. That is, the operator can immediately reply to the inquiry on the spot without going to the depository, resulting in an improvement in service. In addition, the operator directly inputs an article name, a color, a size, and the like to make searches while receiving an inquiry by telephone, and the results are displayed as images. Therefore, a confirmation error can be effectively prevented, and a delivery error due to a confirmation error can be prevented.

In the first embodiment described above, the search processing shown in FIGS. 7A to 7C is performed by the terminal apparatus TM installed in an incoming center, an incoming office, or the like. This processing, however, may be performed by the host computer HT in the head office. In this case, in transmitting images and various pieces of link data from an incoming center or an incoming office which keeps "addressee unknown" packages to the host computer HT, if the center name or office name indicating the depository is added as link data, data indicating-the depository can be displayed, together with the image, in display processing upon operation of the OK key. This allows the head office to quickly give a delivery instruction to the center or office.

INDUSTRIAL APPLICABILITY

According to the present invention, the image processing apparatus analyzes the feature of an image of an article and stores feature data indicating the feature in correspondence with the image so as to enable a quick search for the image of the desired article on the basis of the feature data.

What is claimed is:

1. An image processing apparatus comprising:
an image pick-up device configured to pick-up an image of an object;
a feature data storage device configured to pre-store various feature data character strings representing features of objects;
a feature determining device configured to compare the pick-up image with the various feature data character strings and to determine a feature data character string that represents a feature similar to that of the pick-up image;
an image storage device configured to store the determined feature data character string and the pick-up image, such that the feature data character string and the pick-up image are associated with each other;
an input device configured to designate a feature data character string of a desired object in accordance with a user's operation; and
an image search device configured to search for an image associated with the feature data character strings representing the feature designated by the input device, and to output the searched image.

2. The apparatus according to claim 1, further comprising:
a determination device configured to determine whether or not the feature data character string corresponding to the feature data character string on the object included in the pick-up image has been extracted by the feature determining device;
a message output device configured to display on a display screen a message that prompts input of a feature data character string on the object included in the image, if the determination device determines that no feature data character string has been extracted;
a data input device configured to input feature data character string in accordance with the message displayed on the display screen; and
an image storage control device configured to control the image storage device to store the feature data character string input by the data input device and the input image in association with each other.

3. A computer usable medium having computer readable program code means embodied therein, the computer readable program code means comprising:
means for causing a computer to pick-up an image of an object;
means for causing a computer to store various feature data character strings representing features of objects;
means for causing a computer to compare the pick-up image with the various feature data character strings and to determine a feature data character string that represents a feature similar to that of the pick-up image;
means for causing a computer to store the determined feature data character string and the pick-up image, such that the feature data character string and the pick-up image are associated with each other;
means for causing a computer to designate a feature data character string of a desired object in accordance with a user's operation; and
means for causing a computer to search for an image associated with the feature data character string representing the feature designated by the input device, and to output the searched image.

4. An image processing apparatus comprising:
an image pick-up device configured to pick-up an image of an object;
a color data storage device configured to store various color data character strings, including at least red, blue and green, as feature data character strings which represent colors of objects;
a size data storage device configured to store various size data character strings, including at least large, medium and small, as feature data character strings which represent sizes of the objects;
a color and size determining device configured to compare the pick-up image with the various color data character strings and the various size data character strings and to determine a color data character string and a size data character string that represent a color and a size similar to those of the image of the pick-up image;

an image storage device configured to store the determined color data character string and the determined size data character string and the pick-up image, such that the color data character string and the size data character string are associated with the pick-up image;

an input device configured to designate a color data character string and a size data character string of a desired object in accordance with a user's operation; and an image search device configured to search for an image associated with the color data character string and the size data character string corresponding to the color data character string and size data character string designated by the input device, and to output the searched image.

5. The apparatus according to claim 4, further comprising:

a determination device configured to determine whether or not the color data character string and the size data character string have been extracted by the color and size determining device;

a message output device configured to display on a display screen a message that prompts input of a color data character string and a size data character string as feature data character strings on the object included in the input image, if the determination device determines that none of the feature data character strings, including the color data character string and the size data character string, have been determined;

a data input device configured to input a color data character string and a size data character string as feature data character strings in accordance with the message displayed on the display screen; and an image storage control device configured to control the image storage device to store the color data and the size data as the feature data character strings input by the data input device, and to store the input image in association with the color data character string and the size data character string.

6. A computer usable medium having computer readable program code means embodied therein, the computer readable program code means comprising:

means for causing a computer to pick-up an image of an object;

means for causing a computer to store various color data character strings, including at least red, blue and green, as feature data character strings which represent colors of objects;

means for causing a computer to store various size data character strings, including at least large, medium and small, as feature data character strings which represent sizes of objects;

means for causing a computer to compare the pick-up image with the various color data character strings and the various size data character strings and to determine a color data character string and a size data character string that represent a color and a size similar to those of the image of the pick-up image;

means for causing a computer to store the determined color data character string and determined size data character string, and the pick-up image such that the color data character string and size data character string are associated with the pick-up image;

means for causing a computer to designate a color data character string and a size of a desired object in accordance with a user's operation; and means for causing a computer to search for an image associated with the color data character string and the size data character string corresponding to the color character string and size data character string, and to output the searched image.

7. A carrier service system for delivering a package from a sender to a receiver, the system comprising:

an image pick-up device configured to pick-up an image of the package when the package is delivered to the receiver from the sender;

a feature data storage device configured to store various feature data character strings which represent features of packages;

a feature determining device configured to compare the pickup image with the various feature data character strings and to determine a feature data character string that represents a feature similar to that of the pick-up image;

an image storage device configured to store the determined feature data character string and the pick-up image, such that the feature data character string and the pick-up image are associated with each other;

an input device configured to designate a feature data character string of a desired package in accordance with a user's operation; and an image search device configured to search for an image associated with the feature data character string representing the feature designated by the input device, and to output the searched image.

* * * * *